United States Patent [19]

Lettieri et al.

[11] 3,729,622

[45] Apr. 24, 1973

[54] PRODUCTION STATISTICS COUNTER FOR KEY ENTRY DEVICE

[75] Inventors: John Lettieri, Woodstock, N.Y.; Roger H. E. Pett, Scarborough, Ontario, Canada

[73] Assignee: International Business Machines Corporation, Armonk, N.Y.

[22] Filed: Oct. 29, 1971

[21] Appl. No.: 193,828

[52] U.S. Cl.......235/92 DP, 340/173 RC, 235/92 SH, 235/92 R, 235/92 PD

[51] Int. Cl. ............................................... G07c 3/10

[58] Field of Search......................235/92 SH, 92 PD, 235/92 DP; 328/37; 307/221; 340/173 RC, 173 MS, 174 SR, 168 S

[56] References Cited

UNITED STATES PATENTS

| | | | |
|---|---|---|---|
| 3,394,355 | 7/1968 | Sliwkowski | 340/173 RC |
| 3,416,144 | 12/1968 | Abruzzo et al. | 340/173 RC |
| 3,161,763 | 12/1964 | Glaser | 235/92 DP |
| 3,230,514 | 1/1966 | Kliman | 235/92 DP |

*Primary Examiner*—Maynard R. Wilbur
*Assistant Examiner*—Joseph M. Thesz, Jr.
*Attorney*—James E. Murray et al.

[57] ABSTRACT

This specification describes a counter for measuring the output of a key entry operator. The counter totals the number of strokes the operator makes along with the number of cards produced by the operator and the number of errors made by the operator. The counter includes a shift register which stores in series the key stroke, card and error data described above. This register is synched with the key entry devices operating cycles so that data can be entered without interference with the machine operation.

5 Claims, 6 Drawing Figures

INVENTORS
JOHN LETTIERI
ROGER H.E. PETT

BY James E. Murray
ATTORNEY

PRODUCTION STATISTICS COUNTER FOR KEY ENTRY DEVICE

CROSS REFERENCE TO RELATED APPLICATIONS

1. Application entitled "Word Backspace Circuit For Key Entry Device", inventor — J. Lettieri, Ser. No. 155,449, filed June 22, 1971, and assigned to the same assignee as the present invention.

2. Application entitled "Verify Read Control on 129 Card Data Recorder", inventors — R. B. Battistoni, J. Lettieri, D. L. Pierce and W. J. Weikel, Ser. No. 193,899 filed Oct. 29, 1971, and assigned to the same assignee as the present invention.

3. Application entitled "Accumulator For A Key Entry Device", inventors — J. Lettieri and R. Pett, Ser. No. 193,827, filed Oct. 29, 1971, and assigned to the same assignee as the present invention.

4. Application entitled "Step Motor and Controls For Non-Oscillating Punch/Read Positioning of 80-Column Record Cards", inventors — F. T. Kendall, D. L. Pierce and W. J. Weikel, Ser. No. 158,343, filed June 30, 1971, and assigned to the same assignee as the present invention.

5. Application entitled "Left Zero Circuit For Key Entry Device", inventors — R. B. Battistoni, V. Ferreri, G. A. Gates and J. Lettieri, Ser. No. 187,479, filed Oct. 7, 1971, and assigned to the same assignee as the present invention.

BACKGROUND OF THE INVENTION

The present invention relates to key entry devices having shift register buffers and, more particularly, to a counter for measuring the production of an operator of such a key entry device.

In the operation of a key entry device, it is desirable that the production of a given operator be compared with that of other operators and the operators own past performance. It is also desirable that this function be performed without interference of the operation of the key entry machine by the operator or without the interference with other machine functions.

BRIEF DESCRIPTION OF THE INVENTION

Therefore, in accordance with the present invention, a counter is provided for totaling the number of key strokes made by the operator, the number of error key strokes made by the operator, and the number of cards passed through the machine. These totals can be provided by batch job or machine and are stored automatically in the machine. The counters are reset when desired and the productive data is punched out on a card when the machine is interrogated for the data.

Therefore, it is an object of the present invention to provide a means for measuring the output of an operator of a key entry machine.

It is another object of the present invention to provide means for measuring the output of an operator which does not materially add to the cost of the machine and does not interfere with the running of the machine by the operator.

DESCRIPTION OF THE DRAWINGS

These and other objects, features and advantages of the invention will be apparent from the following more particular description of the preferred embodiment of the invention as illustrated in the accompanying drawings, of which.

Figure 1A:
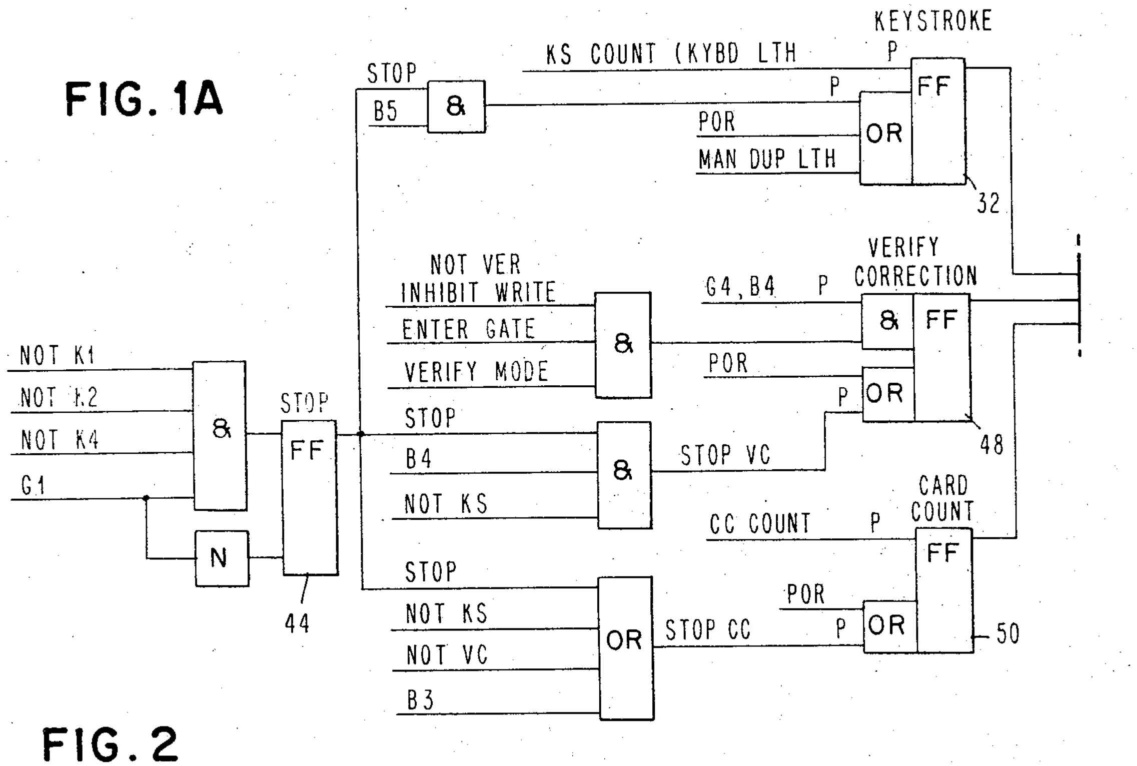
FIGS. 1A to 1C are a logic diagram for loading of the counter in accordance with one embodiment of the present invention.

The descriptive terminology used in the drawings and specification are taken from the IBM Corporation Manual entitled, "129 Data Recorder", Form No. SY22-6871-1, which describes the specific key entry device in which the production accumulating feature of the present invention can be employed.

Figures 1B, 4:
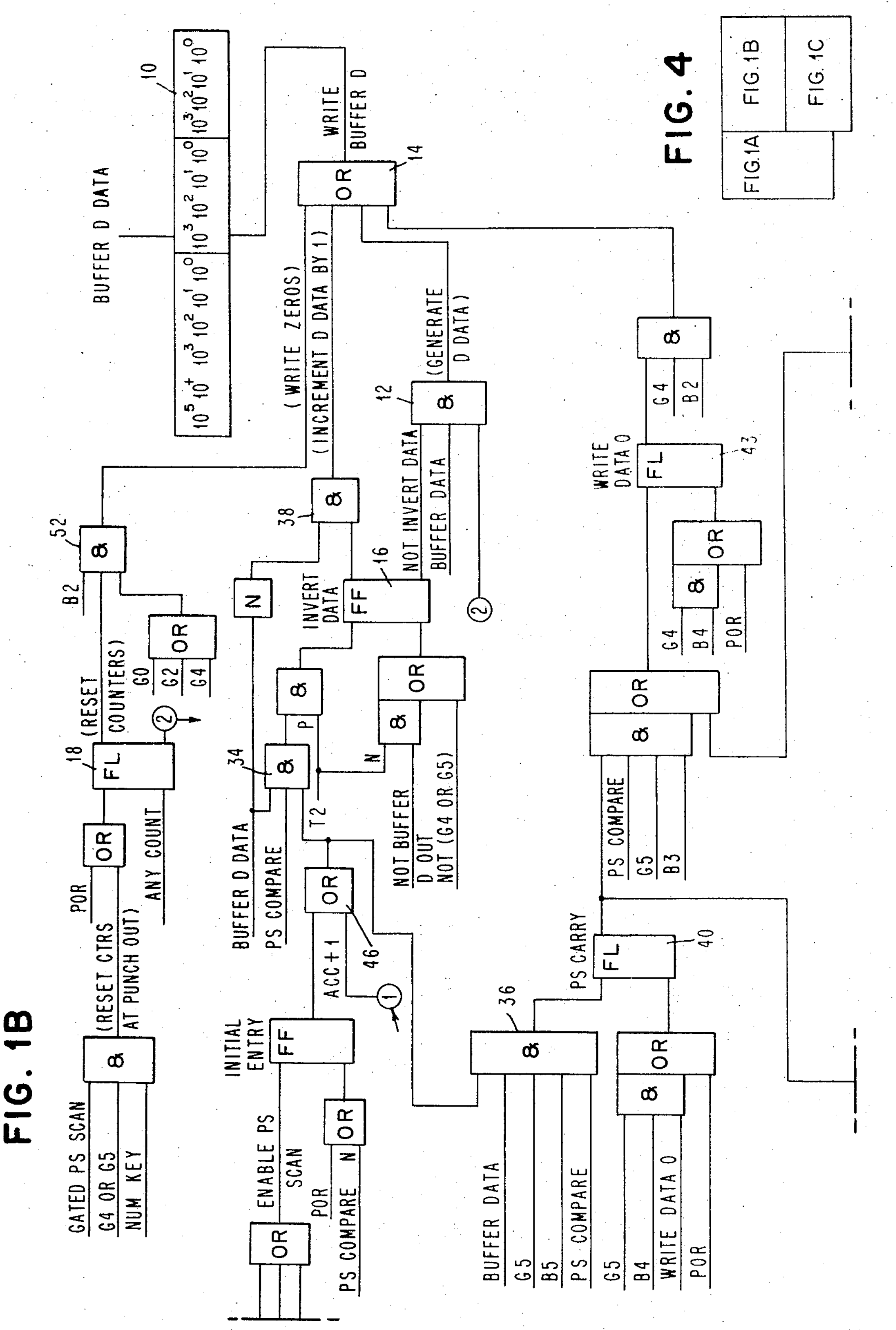
FIG. 4 illustrates how FIGS. 1A to 1C fit together.
Figure 1C:
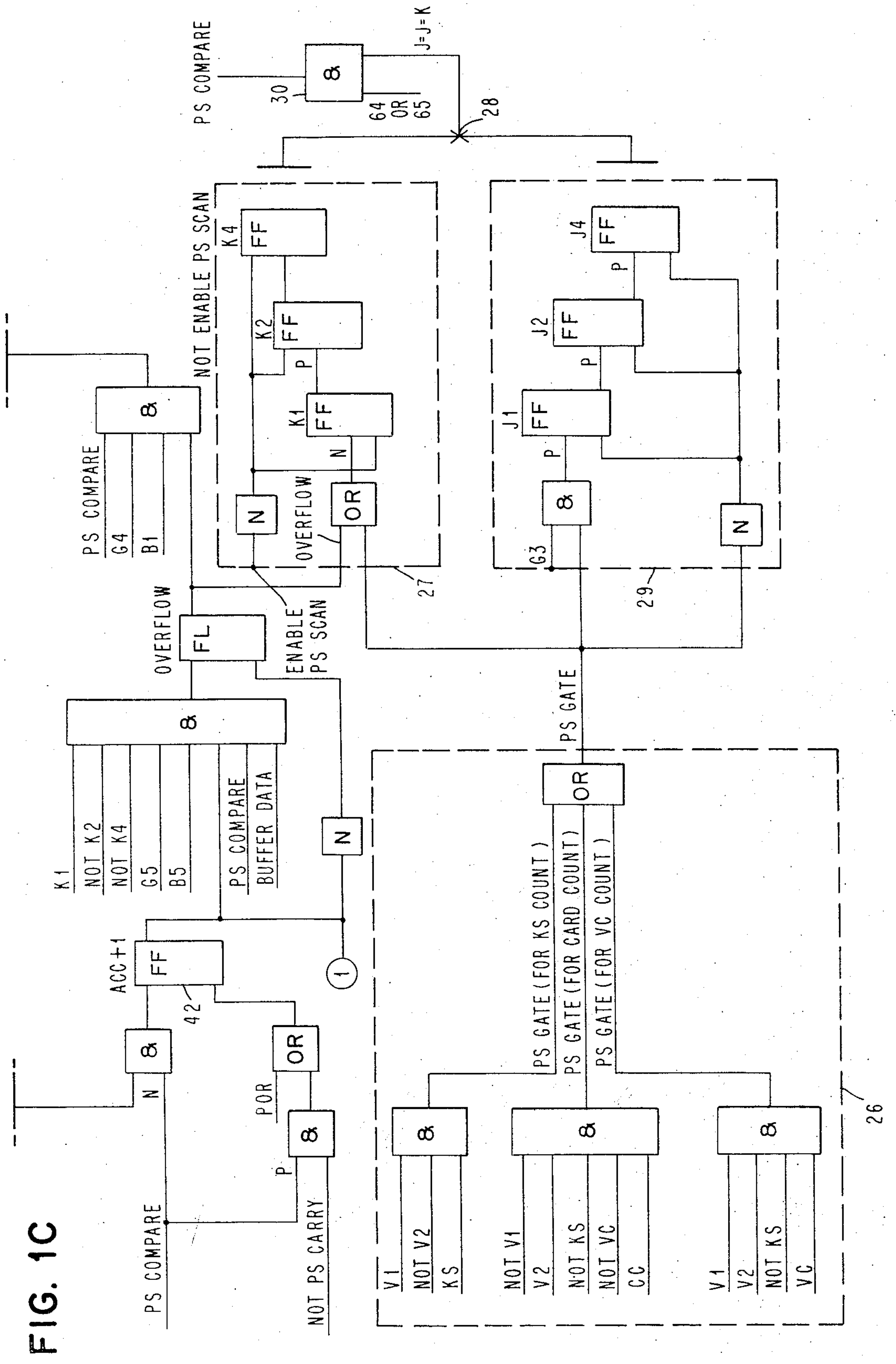

As can be seen in FIGS. 1A to 1C, the buffer 10 is a serial register in which the data is continuously stepped in sequence past an access position. This buffer is a field effect transistor buffer in which data must be regenerated during the stepping operation or will be lost. The data is stored in Hollerith code in the buffer which is operated in synchronism with the main buffers of the key entry device described above.

The main buffers of the key entry device or as they are referred to in the above referenced publication, the A and B buffers are 80-position registers similar to the present register where each position is capable of storing 12 bits of data in Hollerith code. The A buffer receives the data from the keyboard and when all the data for a particular card is entered, it transmits it to the B buffer which then supplies signals to punch data out onto the card. The D buffer, or the buffer for storing the production statistics data when interrogated for such data, provides signals to the A buffer which is eventually punched out in columns 67 through 80 of a card. Six columns, or columns 67 through 72 of the card contain the total number of key strokes used by an operator, while columns 77 through 80 of the card contain the error strokes of the operator, and columns 73 through 76 of the card contain the total number of cards produced by the operator. Each of the columns of the card represents 12 plural bits in the D register. These 12 bits are binary bits of the Hollerith code where the first two positions, 12 and 11 positions, are not used in the register while the next 10, the 0 through 9 positions, are employed. When there is a 0 count in any of the columns of the D register, a binary 1 is stored in the 0 position of that register column while binary 0's are stored in all the other 11 positions of that column. Correspondingly, if there is a 1 stored in a given column of data, a binary 1 is stored in the 1 position of that register column while binary 0's occur in all positions representing that column in the register and so on. Therefore, it can be seen that counting is performed by stepping the binary 1 from one register position to the next register position.

As pointed out previously, this is a field effect transistor register in which data is continuously stepped past an access point position by position. As a position containing a binary 1 passes the access position it must be regenerated if the count in the column of data containing the binary 1 is to remain the same or transferred to the next position of the register if the count is to be increased. Otherwise, the data in the column will be lost. To regenerate the binary 1 in a given position, the binary 1 in the position is fed through an AND gate 12 and OR gate 14 back into the buffer 10 to rewrite the data back into the position. This will happen each time a binary 1 passes the access position of the register so long as the count in the column is not to be increased in which case invert data flipflop 16 is turned on and the requirements of the regenerate AND gate 12 are not met or the counters are to be reset in which case reset count flipflop 18 is turned on so that again the condition for the regenerate AND gate 12 are not met. The operation of these two flipflops 16 and 18 will be explained later. Therefore, as can be seen, as each position passes the access position it is regenerated unless somehow inhibited.

Figure 2:
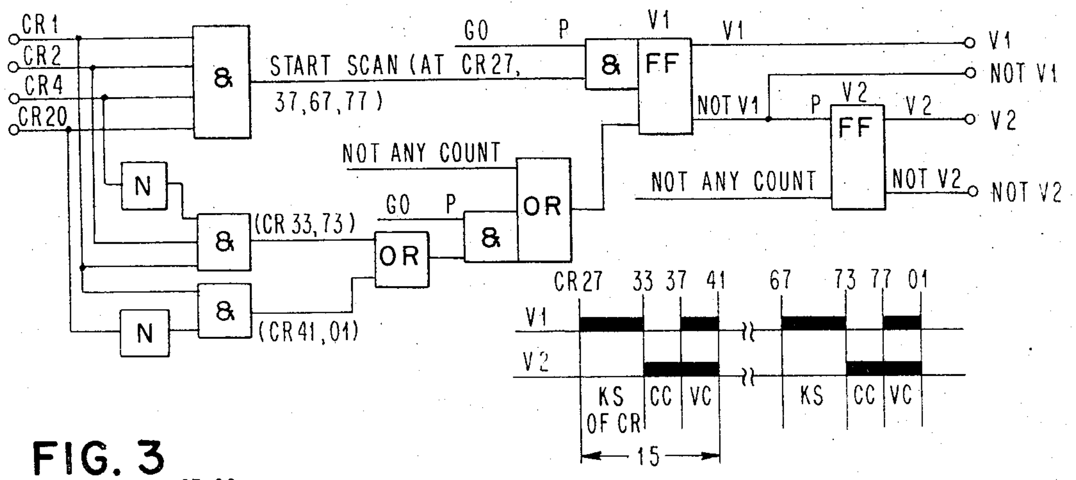
FIG. 2 is a logic diagram for generating timing pulses for accessing the counter in the same embodiment of the present invention.
Figure 3:
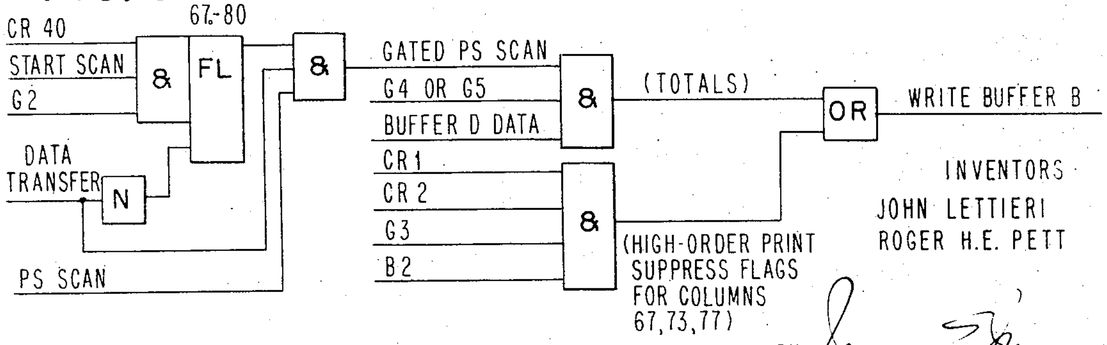
FIG. 3 is a logic diagram for reading out the data from the counter in that embodiment.

To change the count in any of the columns of the counters, it is necessary that the signals to change the count and the positions of the counter to be changed appear simultaneously at the access point of the counter. For this purpose, a PS compare signal is generated. To generate this PS compare signal, the basic machine column ring or CR timing signals are used. The CR1 signal rises on the count of one and drops on the count of two, rises on the count of three and drops on the count of four, and so on. The CR 4 signal rises on the count of four, drops on the count of eight, rises on the count of 12, and drops on the count of 16 and so on. While the CR20 signal rises on the count of 20, drops on the count of 40, rises on the count of 60 and drops on the count of 80. These four signals are fed into the V signal generator 24, shown in FIG. 2, to generate V1 and V2 signals and their complements as indicated by the graphs in FIG. 2. The V signals permit entry into the D buffer during columns 27 to 41 and 67 to 01 of machine cycle times.

Now referring back to FIGS. 1A to 1C, it can be seen that these V signals are fed into a priority circuit 26 to develop a PS Gate signal. The priority circuit 26, along with the V signals, receives key stroke, card count and verify error signals so that a six-column PS Gate signal for key stroke totals has priority over both the four column PS Gate signal for card count signals and the four-column PS Gate signal for verify signals, while the four-column PS Gate signal for verify signals have priority over the four-column PS Gate signal for card count signals. The PS Gate signals are fed into two six position counters 27 and 29 or the J and K counters. The K counter is set to six before counting starts. It decrements by 1 each time all the columns of one of the three counters has been scanned. The J counter 29 increments by 1 for each CR time. For example, the count for the six-column PS Gate signal is sufficient to set the J1, J2 and J4 flipflops. With the J1, J2 and J4 flipflops set and with each of the K flipflops also set, you get a J = K condition. When a J = K condition occurs, a comparator 28 provides a signal to the AND gate 30 to generate a PS compare signal at G4 or G5 time of the main machine cycle times. G times occurs in six equal increments of each column ring or CR time in the main machine. G4 and G5 times are the last two of the equal increments.

The sixth column PS compare signal identifies column 72 of the D counter so that if the key stroke flipflop 32 has been set by a key stroke count from the keyboard of the key entry device, the conditions for AND gate 34 are met when a binary 1 occurs in the access position of the D buffer 10 thereby providing a signal to energize the inverted data flipflop 16. The invert data flipflop 16 remains energized until after buffer D steps one more position and the buffer D data line drops to a binary 0. When the buffer D data line drops, the conditions of AND gate 38 are met thus providing a write signal to buffer D. This means that if a binary 1 was stored in the 1 position of the first column of the key stroke counter, the OR gate 14 would be energized to write a 1 signal in the 2 position of the first column of the key stroke count. Meanwhile, binary 1 in the position is erased because the conditions of AND gate 12 have not been met because of the absence of a not invert data signal from the invert data flipflop 16. Therefore, if there is initially a binary 1 stored in the 1 position of the first column of the key stroke counter, a 1 would now be stored in the 2 position of the 1 indicating the addition of 1 to that column. Likewise, if there were a binary 1 in the 2 position of the column prior to the occurrence of the PS compare signal and the additional key stroke, binary 1 would be placed in the 3 position of the column and the binary 1 in the 2 position would be erased, and so on.

Counting in the above manner continues until there is a binary 1 in the 9 position of the first column. The occurrence of a binary 1 in the 9 position of the first column requires a carry to the second column of the counter. Thus, if a key stroke occurs and a binary 1 is apparent at B5,G5 time, then AND gate 36 sets the PS carry latch 40 which, in turn, sets the accumulator +1 latch 42 and the write data D latch 43. When the accumulator +1 latch 42 is set, a signal is sent through the OR gate 44 to satisfy the requirements of AND gate 34 in place of a key stroke signal so that after the occurrence of a buffer D data signal in the second column of this counter, a write signal is sent to buffer D. When the write 0 data latch 43 is set, a 1 is written in the 0 position of the first column of the counter the next time the position is in the access location of the counter.

Thus, it can be seen that the general operation of incrementing buffer D is to first search serially through the 10 bits of the low order decimal digit to find a binary 1 which signifies a decimal digit by its position in this group of 10 bits. Increasing the count is then accomplished by simply shifting the binary 1 one bit in the high order direction and by erasing the 1 from its previous position. When the binary 1 occurs in the 9 position of a column, there is a carry over to the next higher order column and at the same time a binary 1 is written into the 0 position of the lower order column. Therefore, incrementing starts at the low-order position of a counter and continues until all positions of the counter are scanned to see if any position other than the low-order must also be incremented. For example, when the key stroke counter contains 000299 (decimal) and a key is depressed, the counter must be incremented to 000300. At CR32, the units position is incremented to 0. The next time the 10's position can be examined is at CR71. At this time, the Acc +1 latch increments the 10's position. After three such complete CR cycles, the six position KS counter (or the four position card counter or VC counter) has been completely scanned and the K counter 27 has decremented to zero. With the K counter at zero the stop latch 46 is set. The stop latch then prevents further scanning by resetting the key stroke, verify corrections and card count latches 32, 48, 50 respectively, and sets the K counter back to 6 when the not enable PS scan signal rises. In counting card or verify correction key strokes, two dummy CR cycles are required to decrement the K counter from 6 to 4 before counting is started. During the two dummy CR cycles, no "PS compare" pulse is generated.

When data is to be read out of the machine, it is done by the machine operator putting a card into the machine and placing the machine in a punch out program mode. This reads the data out of buffer D into buffer B which is operating in synchronism with buffer D so that data appears on columns 67 through 80 of the card. When the data is read out, the counters can be set to 0 by energizing reset flipflop 18 to inhibit regeneration through AND gate 12 and places a binary 1 in the 0 positions through AND gate 52.

Therefore, while the invention has been shown and described with respect to the preferred embodiment thereof, it will be understood by those skilled in the art that various changes in form and detail may be made therein without departing from the spirit and scope of the invention.

What is claimed is:

1. In a key entry device having a first serial buffer for recording keyboard entries, a second serial buffer for controlling the recording of data on a media, and means for controlling the transfer of data from the first serial buffer to the second serial buffer, a counter for measuring the productivity of the operator in terms of the number of key strokes the operator makes and the number of punched cards the operator produces, comprising:

register means for storing a running total of the number of key strokes an operator makes and the number of punch cards the operator produces serially in Hollerith code, said register being a dynamic shift register which continuously moves data by an access position binary bit by binary bit;

clock means for synchronizing the shifting of data in the register means with the shifting of data in the first and second serial buffer;

latch means for storing key stroke and card production a single stroke and card at a time until it is added to the running totals stored in the register means; and logic means responsive to said clock means for adding cards and key stroke bits stored in the latch means to the running counts stored in the register means and on reading the running totals out of said register means into the second buffer means to be placed on a media when the productivity of the operator is to be examined.

2. The counter of claim 1 wherein:

data in said register means is stored in a plurality of columns each comprising at least 10 binary bits and the count in the column represented by a single binary 1 in only one of the 10 binary bits.

3. The counter of claim 2 wherein:

said register means is AC stable and the binary 1 in said register means must be regenerated when the location containing the binary 1 is in the access position.

4. The counter of claim 3 including:

restore means for rewriting binary 1's in the register when a location containing a binary 1 is in the access position.

5. The counter of claim 4 wherein:

said logic means comprises means for inhibiting the restore means from rewriting a binary 1 in a location; and means for writing a binary 1 the next location on occurrence of a stored key stroke or card data signal from the latch means and a signal from the clock means.

* * * * *